US009538767B2

(12) United States Patent
Pai et al.

(10) Patent No.: US 9,538,767 B2
(45) Date of Patent: Jan. 10, 2017

(54) DOOR MECHANISM OF A STOCK BIN OF BREAD MAKER

(71) Applicant: Tsann Kuen (Zhangzhou) Enterprise Co., Ltd., Zhangzhou (CN)

(72) Inventors: Wen-Lung Pai, Zhangzhou (CN); Zhong-Hua Zhang, Zhangzhou (CN); Yong-Mou Zhang, Zhangzhou (CN); Jian-Ming Gao, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 86 days.

(21) Appl. No.: 14/571,487

(22) Filed: Dec. 16, 2014

(65) Prior Publication Data

US 2016/0081355 A1 Mar. 24, 2016

(30) Foreign Application Priority Data

Sep. 24, 2014 (CN) .......................... 2014 1 0493278

(51) Int. Cl.
*A21C 1/14* (2006.01)
*A21B 7/00* (2006.01)

(52) U.S. Cl.
CPC ............. *A21C 1/1485* (2013.01); *A21B 7/005* (2013.01)

(58) Field of Classification Search
CPC .................................................... A21C 1/1485
USPC ........................................ 318/671, 560, 34
See application file for complete search history.

(56) References Cited

U.S. PATENT DOCUMENTS

| | | | | |
|---|---|---|---|---|
| 4,202,260 A | * | 5/1980 | Weger .................. | A21C 15/002 222/368 |
| 5,615,605 A | * | 4/1997 | Kakimoto .............. | A21B 7/005 366/146 |
| 6,223,430 B1 | * | 5/2001 | Myszka ................. | A21B 7/005 174/16.3 |
| 6,257,861 B1 | * | 7/2001 | Morikawa .............. | A21C 3/027 425/363 |
| 6,761,107 B2 | * | 7/2004 | Oshita .................... | A21B 7/005 366/146 |

FOREIGN PATENT DOCUMENTS

| | | |
|---|---|---|
| CN | 102670085 A | 9/2012 |
| EP | 2710895 A3 | 8/2014 |
| JP | 2004121542 A | 4/2004 |
| JP | 2010094416 A | 4/2010 |
| JP | 2010094419 A | 4/2010 |
| TW | 580045 U | 3/2004 |
| TW | 1405895 B | 8/2013 |
| WO | 2006/037115 A3 | 4/2006 |

* cited by examiner

*Primary Examiner* — David S Luo
(74) *Attorney, Agent, or Firm* — Husch Blackwell LLP (57) ABSTRACT

A door mechanism for disposing on a bin body, which has an inner periphery defining an opening, includes a door panel unit configured to be pivoted to the inner periphery of the bin body to openably close the opening, a hinge unit configured to pivotally connect the door panel unit to the inner periphery of the bin body, a rotary wheel unit for controlling rotation of the hinge unit, a drive unit pivoted between the rotary wheel unit and the hinge unit, and a motor unit for driving rotation of the rotary wheel unit. When the rotary wheel unit is driven by the motor unit to rotate, the rotary wheel unit drives rotation of the drive unit which in turn drives the hinge unit to rotate said door panel unit to an open or a closed position.

8 Claims, 7 Drawing Sheets

DOOR MECHANISM OF A STOCK BIN OF BREAD MAKER

CROSS REFERENCE TO RELATED APPLICATION

This application claims priority of Chinese Patent Application No. 201410493278.7, filed on Sep. 24, 2014.

FIELD OF THE INVENTION

The invention relates to a bread maker, and more particularly to a door mechanism of a stock bin of a bread maker.

BACKGROUND OF THE INVENTION

Figure 1:
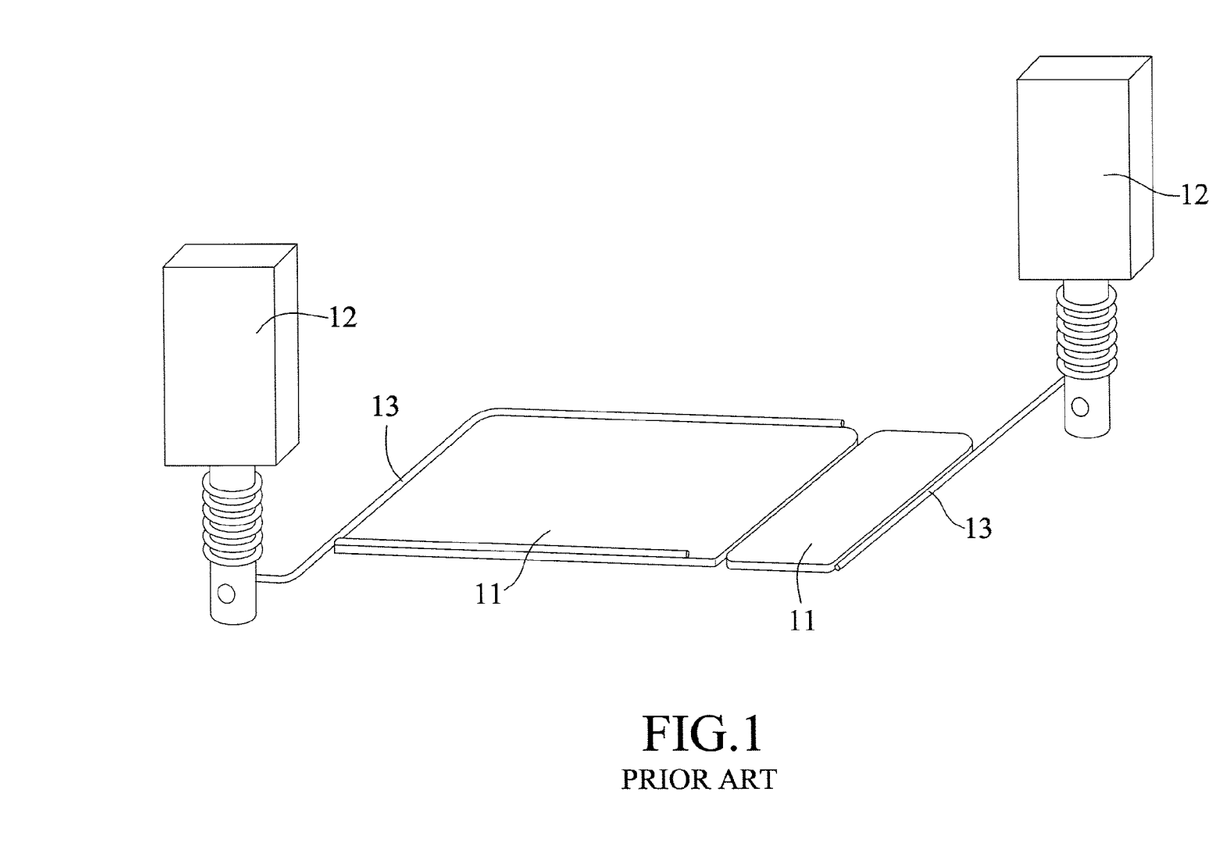
FIG. 1 illustrates a conventional door mechanism of a stock bin of a bread maker.

FIG. 1 illustrates a conventional door mechanism of a stock bin of a bread maker. The door mechanism includes two rotatable door panels 11, two electromagnets 12 respectively controlling rotation of the door panels 11, and two connectors 13 each of which interconnects one of the door panels 11 and a respective one of the electromagnets 12. When the electromagnets 12 are energized, the connectors 13 are actuated by the electromagnets 12 to respectively drive the door panels 11 to rotate to an open position. When the electromagnets 12 are de-energized, the door panels 11 rotate to a closed position. However, because the electromagnets 12 can generate heat which can weaken the magnetic force thereof, it is likely to occur that the torque for opening the door panels 11 will be insufficient. Hence, there is room for improvement of the conventional door mechanism of the bread maker.

SUMMARY OF THE INVENTION

An object of this invention is to provide a door mechanism of a stock bin of a bread maker that is capable of overcoming the aforesaid drawbacks of the prior art.

Accordingly, a door mechanism of this invention is suitable for disposing on a bin body of a stock bin of a bread maker. The bin body is configured to temporary receive bread ingredients and has an inner periphery defining an opening. The door mechanism comprises a door panel unit configured to be pivoted to the inner periphery of the bin body to openably close the opening, a hinge unit configured to pivotally connect the door panel unit to the inner periphery of the bin body, a rotary wheel unit for controlling rotation of the hinge unit, a drive unit pivoted between the rotary wheel unit and the hinge unit, and a motor unit for driving rotation of the rotary wheel unit. The door panel unit is movable between a closed position, in which the door panel unit closes the opening in the bin body to prevent the bread ingredients from falling, and an open position, in which the door panel unit exposes the opening in the bin body to permit falling of the bread ingredients from the bin body. When the rotary wheel unit is driven by the motor unit to rotate, the rotary wheel unit drives rotation of the drive unit which in turn drives the hinge unit to rotate said door panel unit to the open or closed position.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENTS

Before the present invention is described in greater detail with reference to the accompanying embodiments, it should be noted herein that like elements are denoted by the same reference numerals throughout the disclosure.

Referring to FIGS. 2 to 5, a door mechanism according to the first embodiment of the present invention is suitable for disposing on a bin body 21 of a stock bin of a bread maker. The bin body 21 is rectangular, is configured to temporary receive bread ingredients 9 (see FIG. 4), and has a rectangular inner periphery 211 defining an opening 212. The door mechanism of this embodiment comprises a door panel unit 3, a hinge unit 4, a rotary wheel unit 5, a motor unit 6, a drive unit 7, and a control unit 8.

Figure 2:
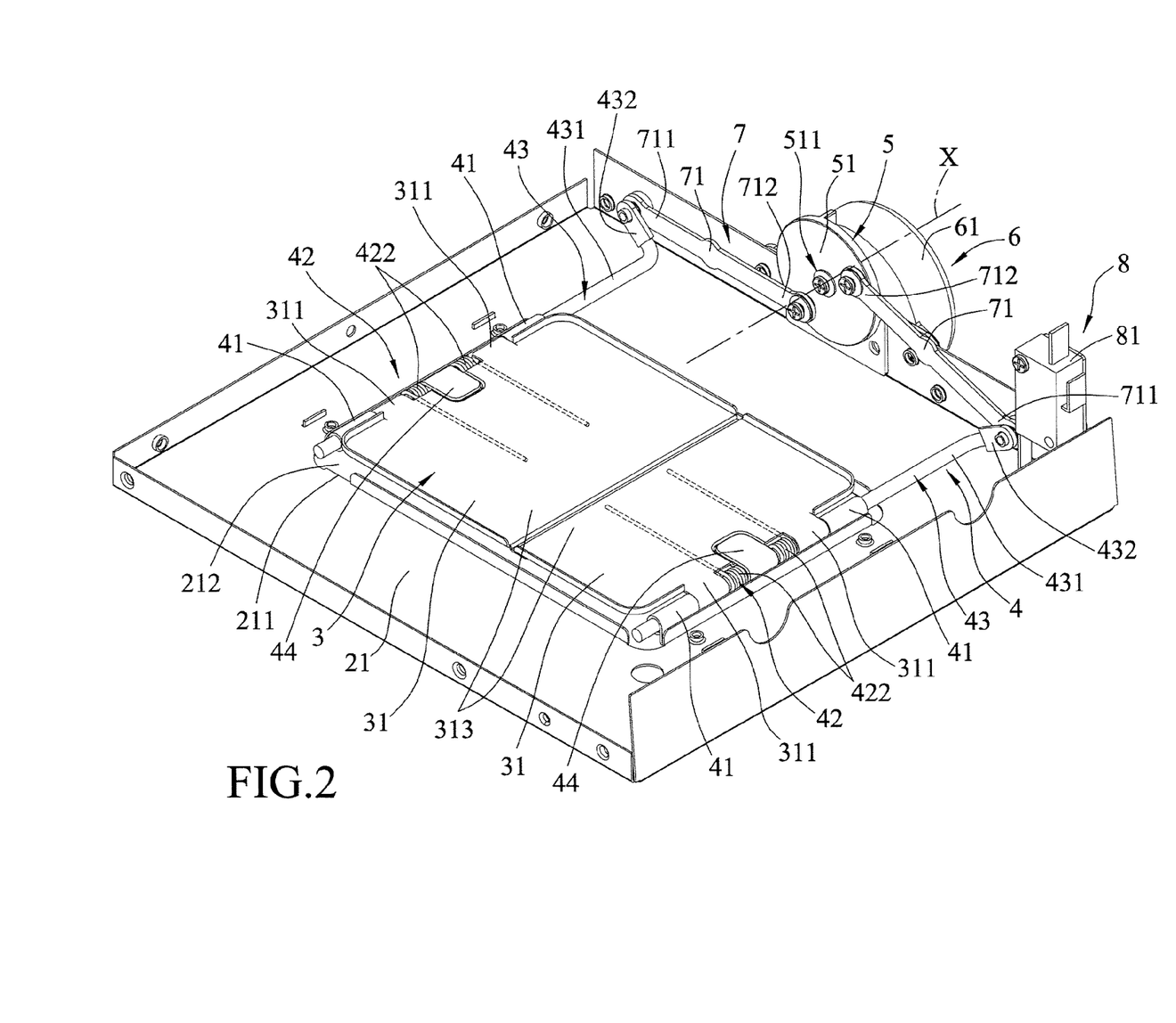
FIG. 2 is a perspective view of a door mechanism of a stock bin of a bread maker according to the first embodiment of the present invention.
Figure 4:
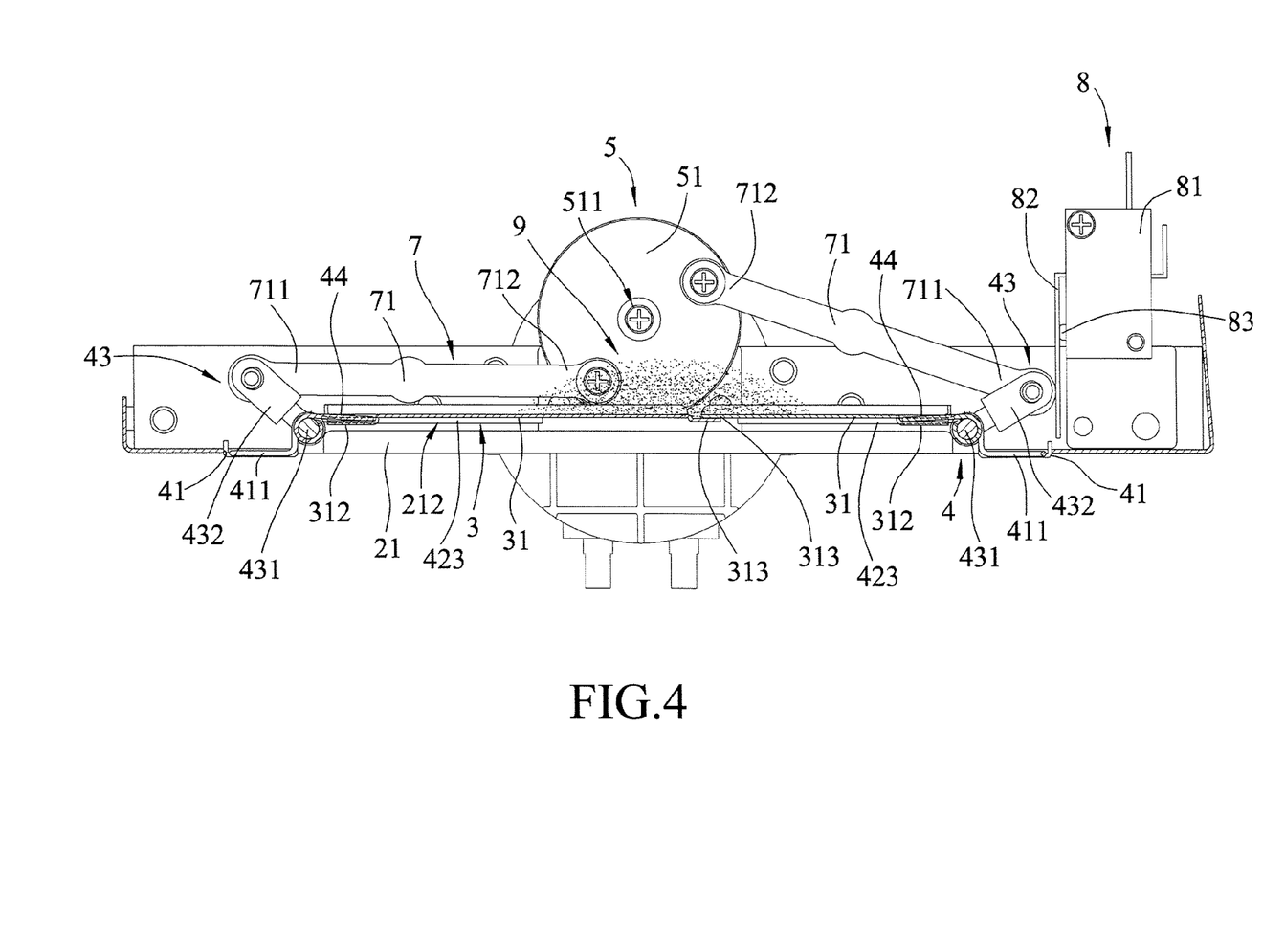
FIG. 4 is a partly sectional view of the first embodiment, illustrating a door panel unit in a closed position.

The door panel unit 3 includes two door panels 31 configured to temporary hold the bread ingredients 9 and configured to openably close the opening 212. Each of the door panels 31 has two spaced-apart pivoting portions 311 at one end thereof, an indented portion 312 formed between the pivoting portions 311, and an abutment portion 313 opposite to the pivoting portions 311 for abutting against the abutment portion 313 of the other door panel 31. The door panels 31 are configured to be hinged to a respective one of the left and right short sides of the inner periphery 211 of the bin body 21 through the pivoting portions 311 thereof. As shown in FIG. 2, the door panel 31 pivoted to the left short side of the inner periphery 211 of the bin body 21 (i.e., left door panel 31) has a size larger than the door panel 31 pivoted to the right short side of the inner periphery 211 of the bin body 21 (i.e., right door panel 31). The abutment portion 313 of the right door panel 31 is disposed above and abuts against the abutment portion 313 of the left door panel 31, as best shown in FIG. 4. In actual practice, the size of the door panels 31 may be the same. Hence, the size of the door panels 31 is not limited to the disclosed embodiment.

Figure 3:
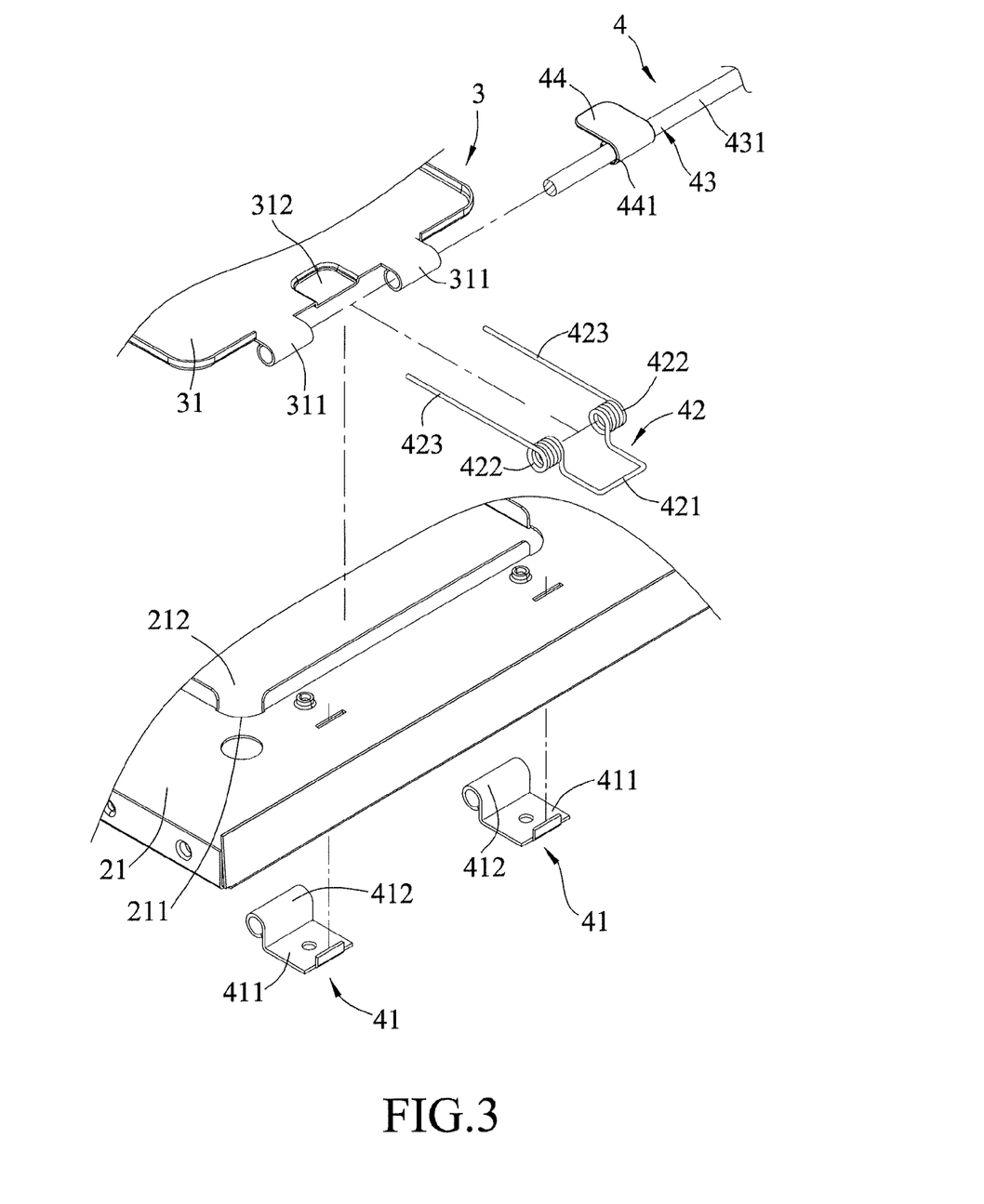
FIG. 3 is a fragmentary exploded perspective view of the first embodiment.

The hinge unit 4 includes four hinge members 41, two torsion springs 42, two pivot shafts 43, and two press plates 44. Two of the hinge members 41 are spacedly disposed on the left short side of the inner periphery 211 of the bin body 21, while the other two hinge members 41 are spacedly disposed on the right short side of the inner periphery 211 of the bin body 21. Each of the hinge members 41 has a flat plate portion 411 fixed to the bin body 21 in proximity to a corresponding left or right side of the inner periphery thereof, and a tubular portion 412 fixed to one end of the flat plate portion 411. The pivoting portions 311 of each door panel 31 are flanked by the tubular portions 412 of the two hinge members 41 that are disposed on the corresponding left or right short side of the inner periphery 211 of the bin body 21.

Each of the torsion springs 42 is disposed between the pivoting portions 311 of a respective door panel 31, and includes a U-shaped bent section 421 positioned in the bin body 21, two coil portions 422 respectively connected to two opposite ends of the U-shaped bent section 421 and respectively adjacent to the pivot portions 311 of the respective door panel 31, and two straight sections 423 opposite to the U-shaped bent section 421 and respectively extending from the coil portions 422 to a bottom side of the respective door panel 31.

Each of the pivot shafts 43 is L-shaped, and has a first shaft section 431 rotatably extending through the tubular portions 412, the pivoting portions 311 and the coil portions 422 on the same side of the inner periphery 211 of the bin body 21 so as to pivotably connect each door panel 31 to the respective left or right side of the inner periphery of the bin body 21. Each pivot shaft 43 further has a second shaft section 432 connected transversely to and shorter than the first shaft section 431 for connection with the drive unit 7. The second shaft section 432 of each pivot shaft 43 is proximate to one of the long sides of the bin body 21.

Each of the press plates 44 has one end provided with a tubular portion 441 sleeved fixedly to a respective one of the pivot shafts 43 so that each press plate 44 is rotatable along with the respective pivot shaft 43. Each press plate 44 is disposed between the coil portions 422 of a respective torsion spring 42, and abuts against the indented portion 312 of the respective door panel 31 to press the respective door panel 31 to rotate downward.

The rotary wheel unit 5 includes a rotary wheel 51 disposed on the long side of the bin body 21 between the second shaft sections 432 of the pivot shafts 43 and spaced apart from the door panels 31. The rotary wheel 51 is circular, and having a rotational axis (X) passing through a wheel center 511 thereof.

The motor unit 6 includes a motor 61 for driving rotation of the rotary wheel 51. In this embodiment, the motor 61 directly drives rotation of the rotary wheel 51. However, in actual practice, a reduction gear assembly having a large torque may be provided between the motor 61 and the rotary wheel 51 in order to achieve a torque amplifying effect.

The drive unit 7 includes two drive rods 71 each of which is pivoted between the rotary wheel 51 and a corresponding one of the pivot shafts 43. Each of the drive rods 71 has a first end 711 pivoted to the second shaft section 432 of the corresponding pivot shaft 43, and an opposite second end 712 pivoted to the rotary wheel 51 offset from the wheel center 511. The second ends 712 of the drive rods 71 are spaced apart from each other. The second end 712 of one of the drive rods 71 is pivoted to the right side of the rotary wheel 51, while the second end 712 of the other drive rod 71 is pivoted to the left side of the rotary wheel 51, as shown in FIG. 2.

The control unit 8 is used to control operation of the motor 61, and includes a main body 81, an elastic member 82 disposed movably on the main body 81, and a press button 83 slidably received in the main body 81 and having one end disposed in the main body 81 and the other end abutting against the elastic member 82.

Figure 5:
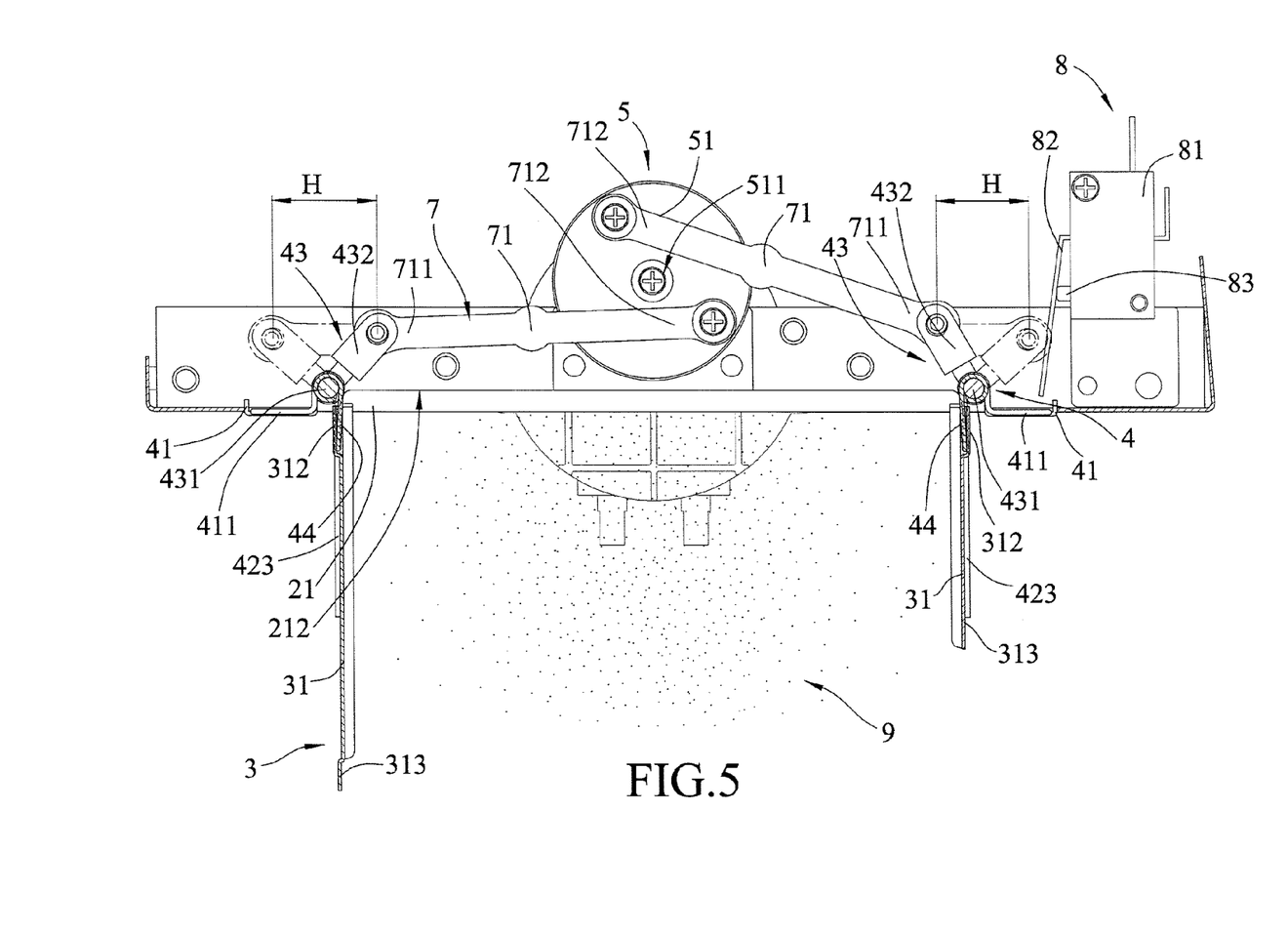
FIG. 5 is a view similar to FIG. 4, but illustrating the door panel unit in an open position.

The door panels 31 are movable between a closed position, as shown in FIG. 4, and an open position, as shown in FIG. 5. In the closed position, the abutment portions 313 of the door panels 31 are abuttingly connected to each other, so that the door panels 31 can cooperate with each other to close the opening 212 to prevent the bread ingredients 9 from falling out of the bin body 21. When the motor 61 is operated and the rotary wheel 51 is driven to rotate, the second ends 712 of the drive rods 71 can move arcuately about the rotational axis (X), so that the first ends 711 of the drive rods 71 can pull the second shaft sections 432 of the pivot shafts 43 to pivot inwardly toward each other. Simultaneously, the first shaft sections 431 of the pivot shafts 43 can drive the door panels 31 to rotate downward to the open position. The length of each second shaft section 432 is designed to be shorter than the length of each first shaft section 431 so that an operation distance (H) (see FIG. 5) of each second shaft section 432 is shorter. That is, a space for operation thereof is small, so that the door mechanism has the advantage of having a small size or volume. In the open position, the door panels 31 are in a vertical or upright position, and expose the opening 212, so that the bread ingredients 9 (see FIG. 4) originally disposed on the door panels 31 are permitted to fall down from the bin body 21. At this time, each of the torsion springs 42 is rotated to store an elastic force, and the second ends 712 of the drive rods 71 are respectively rotated to the left and right sides of the rotary wheel 51.

After the bread ingredients 9 have fallen down from the bin body 21, the motor 61 is operated to reversely rotate the rotary wheel 51, so that the second ends 712 of the drive rods 71 move arcuately about the rotational axis (X) back to their original positions. At this time, the second shaft sections 432 are pushed by the drive rods 71 to pivot outwardly away from each other, so that the first shaft sections 431 can drive the door panels 31 to rotate upward to the closed position. During movement of the door panels 31 from the open position to the closed position, the stored elastic forces of the torsion springs 42 are released, so that the straight sections 423 of the torsion springs 42 can pull upward the door panels 431 and assist the door panels 31 to close the opening 212.

The motor 61 used in this embodiment is a reciprocal motor that can continuously drive the door panels 31 to move between the closed position and the open position. During making of the bread, the door panels 31 will open many times, the purpose of which is to prevent the bread ingredients 9 from remaining on the door panels 31. Every time the door panels 31 are moved from the closed position shown in FIG. 4 to the open position shown in FIG. 5, the first end 711 of the drive rod 71 that is disposed on the right side of the rotary wheel 51 is moved away from the elastic member 82 of the control unit 8. When the door panels 31 are moved from the open position shown in FIG. 5 to the closed position shown in FIG. 4, the first end of the right drive rod 711 abuts and presses against the elastic member 82 of the control unit 8. The elastic member 82, in turn, presses the press button 83. Each time the press button 83 is pressed, it will send a press signal to a control module (not shown) of the control unit 8. The control module may be a CPU, but is not limited as such. When the number of press signals received by the control module of the control unit 8 reaches a predetermined value, the control module will generate a stop signal for stopping the supply of power to the motor 61 so as to stop the operation thereof. As such, rotation of the rotary wheel 51 is stopped, and the door panels 51 cannot be opened.

Figure 6:
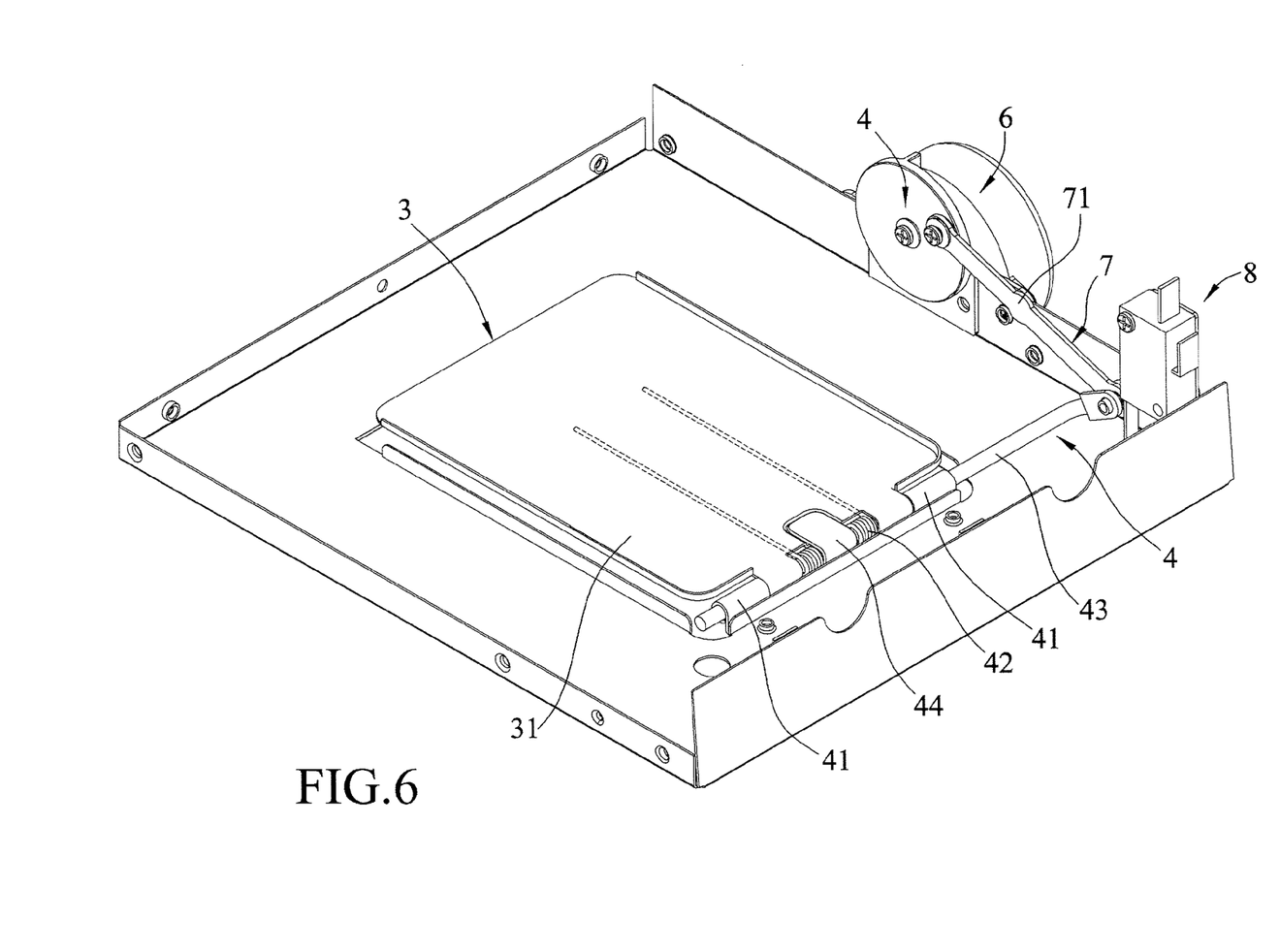
FIG. 6 is a perspective view of a door mechanism of a stock bin of a bread maker according to the second embodiment of the present invention.

Referring to FIG. 6, a door mechanism according to the second embodiment of the present invention is shown to be similar to the first embodiment. However, in this embodiment, the door panel 3 only includes one door panel 31, and the hinge unit 4 only includes two hinge members 41, one torsion spring 42, one pivot shaft 43, and one press plate 44.

Further, the drive unit 7 only includes one drive rod 71. The drive rod 71 can push the elastic member 82 (see FIG. 4) of the control unit 8 to press the press button 83 (see FIG. 4). The advantages of the first embodiment can be similarly achieved using the second embodiment.

Figure 7:
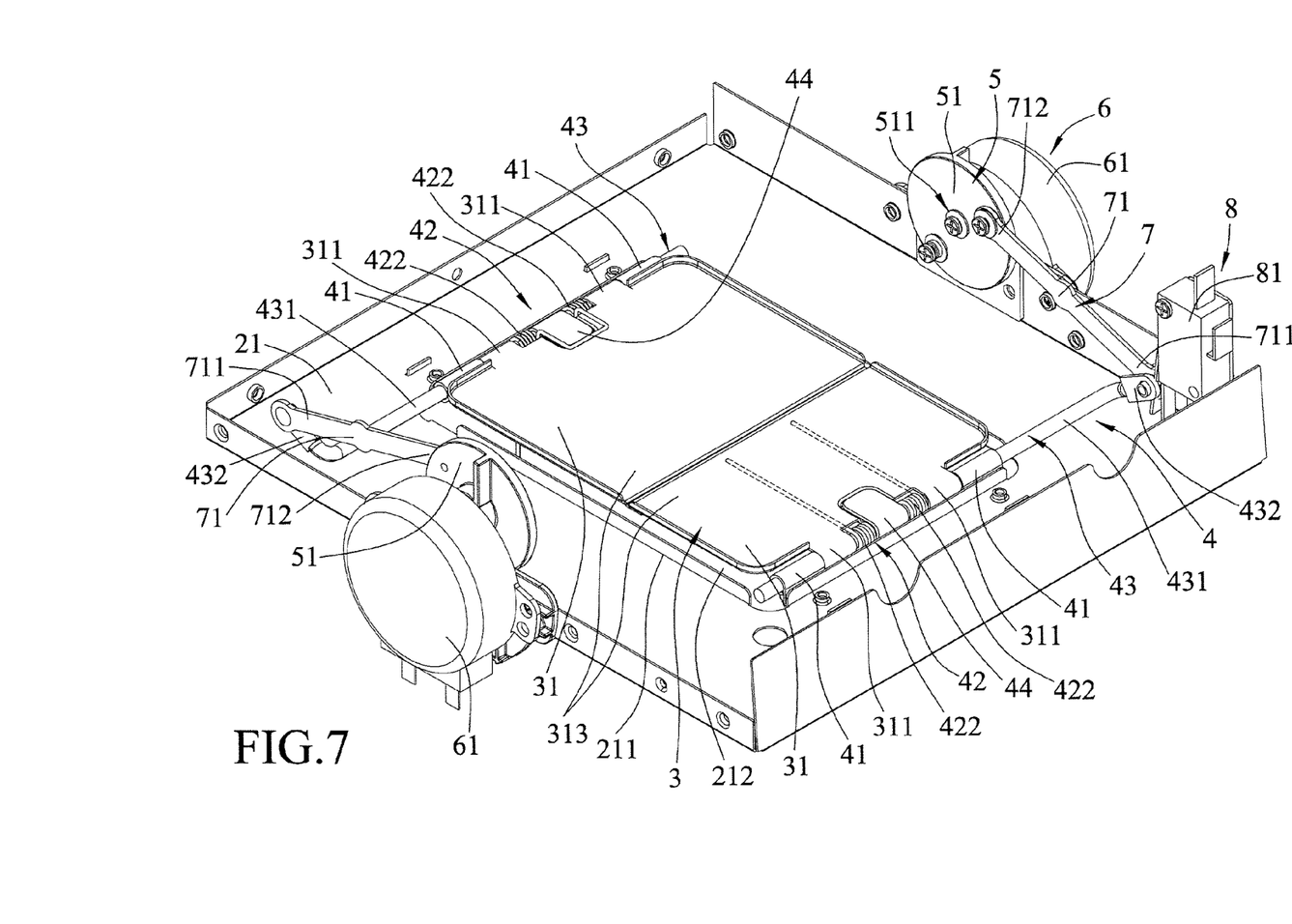
FIG. 7 is a perspective view of a door mechanism of a stock bin of a bread maker according to the third embodiment of the present invention.

Referring to FIG. 7, a door mechanism according to the third embodiment of the present invention is shown to be similar to the first embodiment. However, in this embodiment, the rotary wheel unit 5 includes two rotary wheels 51 disposed on two opposite sides of the bin body 21, and the motor unit 6 includes two motors 61 to respectively rotate the rotary wheels 51. Further, each drive rod 71 is pivoted between one of the rotary wheels 51 and a corresponding one of the pivot shafts 43 of the hinge unit 4. Through this, the door panels 31 can be opened and closed in succession. The advantages of the first embodiment can be similarly achieved using the third embodiment.

In sum, the door mechanism of this invention uses the motor unit 6 to actuate the rotary wheel unit 5 and drive rotation of the door panel(s) 31. Because the motor unit 6 can be continuously rotated, the rotation thereof is smooth and will not produce noise due to sudden impact. Further, the motor unit 6 not only has sufficient torque, but also the torque thereof will not weaken due to excessive heat. Therefore, the object of this invention can be realized.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A door mechanism suitable for disposing on a bin body of a stock bin of a bread maker, the bin body being configured to temporary receive bread ingredients and having an inner periphery defining an opening, said door mechanism comprising:
    a door panel unit configured to be pivoted to the inner periphery of the bin body to openably close the opening;
    a hinge unit configured to pivotally connect said door panel unit to the inner periphery of the bin body;
    a rotary wheel unit for controlling rotation of said hinge unit;
    a drive unit pivoted between said rotary wheel unit and said hinge unit; and
    a motor unit for driving rotation of said rotary wheel unit;
    wherein said door panel unit is movable between a closed position, in which said door panel unit closes the opening in the bin body to prevent the bread ingredients from falling, and an open position, in which said door panel unit exposes the opening in the bin body to permit falling of the bread ingredients from the bin body; and
    wherein, when said rotary wheel unit is driven by said motor unit to rotate, said rotary wheel unit drives rotation of said drive unit which in turn drives said hinge unit to rotate said door panel unit to the open or closed position.

2. The door mechanism as claimed in claim 1, wherein said door panel unit includes two door panels configured to be hinged to left and right sides of the inner periphery of the bin body, respectively, said hinge unit including two pivot shafts each of which is used to connect a respective one of said door panels to a corresponding one of the left and right sides of the inner periphery of the bin body, said drive unit including two drive rods each of which is pivoted between said rotary wheel unit and a corresponding one of said pivot shafts, said door panels cooperating with each other for closing the opening in the bin body when said door panel unit is in the closed position, and being spaced apart from each other for exposing the opening in the bin body when said door panel unit is in the open position.

3. The door mechanism as claimed in claim 2, wherein said hinge unit further includes two torsion springs respectively sleeved on said pivot shafts and respectively biasing said door panels to the closed position.

4. The door mechanism as claimed in claim 2, wherein said rotary wheel unit includes a rotary wheel disposed between said pivot shafts, said rotary wheel having a rotational axis passing through a wheel center thereof, each of said drive rods having a first end pivoted to a corresponding one of said pivot shafts, and a second end opposite to said first end and pivoted to said rotary wheel offset from said wheel center, said second ends of said drive rods being spaced apart from each other.

5. The door mechanism as claimed in claim 4, wherein each of said pivot shafts is L-shaped, and has a first shaft section rotatably connected to a corresponding one of said door panels, and a second shaft section pivoted to said first end of a corresponding one of said drive rods.

6. The door mechanism as claimed in claim 5, wherein said second shaft section is shorter than said first shaft section.

7. The door mechanism as claimed in claim 4, further comprising a control unit for controlling operation of said motor unit, said first end of one of said drive rods abutting against said control unit when said door panel unit is in the closed position and being spaced apart from said control unit when said door panel unit is in the open position.

8. The door mechanism as claimed in claim 2, wherein said rotary wheel unit includes two rotary wheels, said motor unit including two motors for respectively driving rotation of said rotary wheels, each of said drive rods being pivoted between one of said rotary wheels and a corresponding one of said pivot shafts.

\* \* \* \* \*